Figure 1:
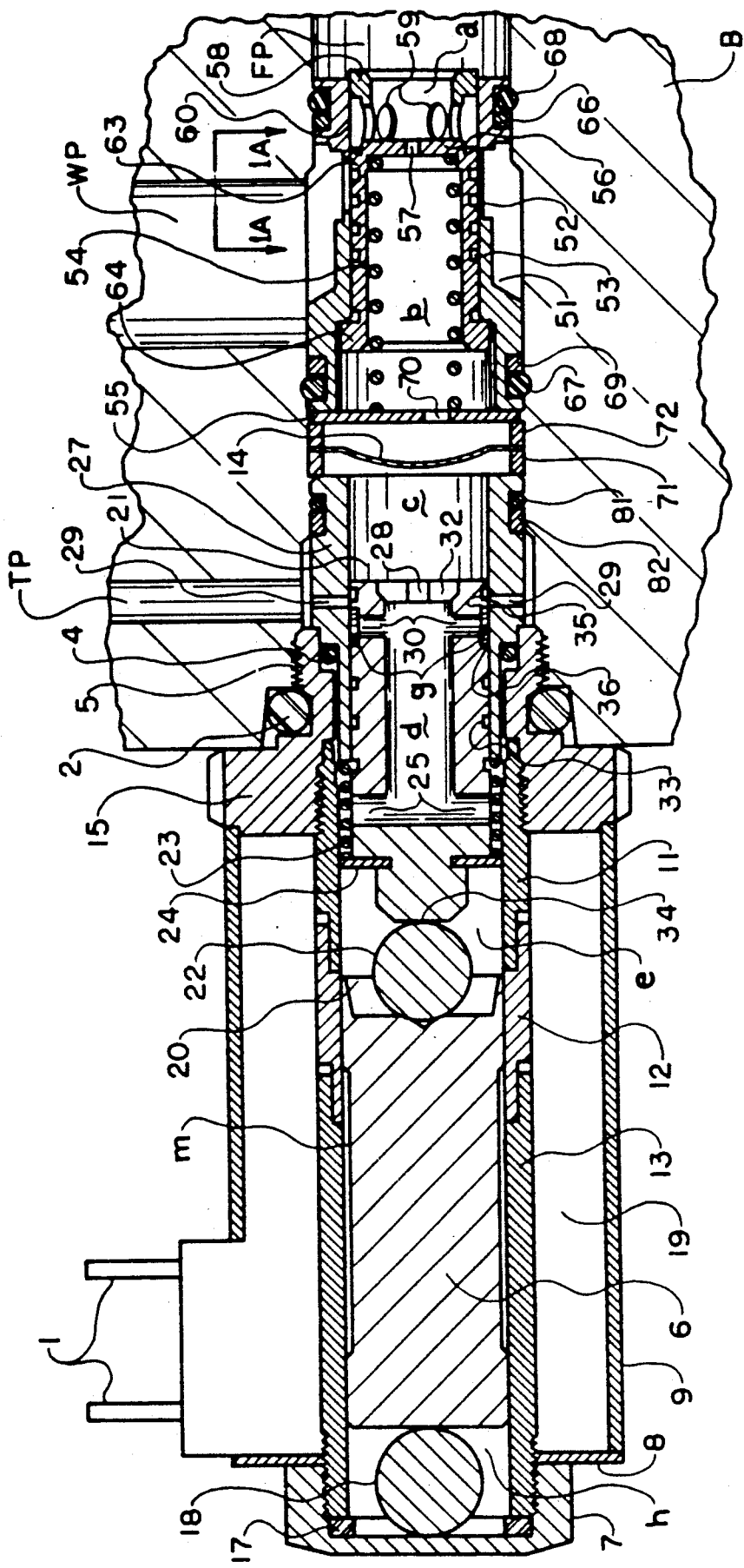

United States Patent [19]

Degenfelder et al.

[11] Patent Number: 5,020,772
[45] Date of Patent: Jun. 4, 1991

[54] PROPORTIONAL ELECTROMAGNETIC FLOW VALVE

[76] Inventors: Joseph R. Degenfelder, 3103 Morley Rd., Shaker Hts., Ohio 44122; James F. Sikorski, 6463 Seminole Dr., Mentor, Ohio 44060

[21] Appl. No.: 310,636

[22] Filed: Feb. 15, 1989

[51] Int. Cl.$^5$ .............................................. F16K 31/40
[52] U.S. Cl. ................... 251/30.02; 251/44; 251/129.07
[58] Field of Search ................ 257/30.01, 30.02, 33, 257/44, 129.01, 129.07, 129.08

[56] References Cited

U.S. PATENT DOCUMENTS

| | | | |
|---|---|---|---|
| 2,845,086 | 5/1958 | Waterman et al. | 137/504 |
| 3,725,747 | 4/1974 | Cowan | 361/154 |
| 4,206,781 | 3/1981 | Salter | 137/504 |
| 4,305,566 | 12/1981 | Grawunde | 251/30.02 |
| 4,345,737 | 8/1982 | Kawai | 251/129.08 X |
| 4,430,846 | 7/1984 | Presley et al. | 251/129.07 X |
| 4,461,656 | 8/1984 | Ross | 148/16.6 |
| 4,553,732 | 6/1985 | Brundage et al. | 251/30.01 |
| 4,750,704 | 6/1988 | Brundage | 251/30.02 |
| 4,766,921 | 8/1988 | Williams | 251/129.08 X |

OTHER PUBLICATIONS

Rotors, H. C. Electromagnetic Devices, John Wiley & Sons, NYC Jun. 1941.
Lee & Blackburn, "Steady State Axial Forces on Control Valve Pistons", ASME Paper No. 51-A52, Aug. 7, 1951.
Inoue, R. "Contaminant Effects on Electrohydraulic Control Valves", SAE Technical Paper 820649 (May 1982).
Hydraulics & Pneumatics, vol. 40, No. 5, May 1987, Zin, Z. L. "Basics of Breakdown Forces in Spool Valves".

Primary Examiner—John Rivell

[57] ABSTRACT

A remotely controllable proportional pilot flow valve includes a common steel armature with a concave attracted end which is magnetically semi-saturated in the design range of energization, providing a flat force response curve. The armature has a recessed midsection to improve tolerance to particulate contamination in the working fluid and two opposed flats for improved venting.

11 Claims, 7 Drawing Sheets

PROPORTIONAL ELECTROMAGNETIC FLOW VALVE

1. FIELD OF THE INVENTION

This invention relates to the art of fluid valves for control of flow at low and high pressure. The invention is particularly applicable to two stage valves in which a pilot section controls the opening and closing of a larger main section valve. Further this invention discloses improved electromagnetic control in a cartridge valve configuration to provide a control function previously available only from complex and costly electrohydraulic technology. This invention combines use of a small amount of electrical energy, a simple controller, and a compact valve to provide electrohydraulic proportional control of fluid flow.

2. DESCRIPTION OF PRIOR ART

A basic flow regulator in cartridge form is disclosed in U.S. Pat. No. 2 845,086 by Waterman and Stark. This patent discloses several techniques in controlling undesirable leakage and pressure imbalances which occur in flow controls operating over 1000 psi and which techniques have since become standard in use. This Waterman/Stark valve uses a manually adjustable spring as the main control element, so only one controlled flow rate was possible. The use of springs to determine the opening pressure of the valve precludes remote control Electric motor adjustment allows remote control but is expensive, bulky and relatively slow to react For proportional flow control, an improvement is needed in cost effectiveness to widen applications, particularly for mobile equipment. Several types of electrohydraulic flow control valves are currently sold for remote electronic control of fluid flow rate, namely proportional valves, on-off solenoid valves, and pulse-width energized solenoids, each of which has limitations. Other electrohydraulic proportional flow controls use spool position to control flow, with onboard electronics to measure actual spool position and integrate this feedback with the command signal for continuous repositioning. Such proportional valves are physically large in relation to the flow volume controlled compared to a cartridge valve with the same capacity and are expensive. Electrically powered solenoid valves are mass produced in cartridge form, but their simple electromagnetic circuit previously enabled only full open or completely shut as control points.

Pulse width solenoids cycled at 30-40 Hz must operate at reduced pressure under 500 psi, have marginal resolution under 10 amp at 12 VDC, and exhibit high wear and contamination sensitivity.

Earlier disclosures are limited on the use of electromagnetic proportional control. The basic text which combines an empirical and theoretical approach is Rotors Herbert C. *Electromagnetic Devices*, John Wiley & Sons, New York 1941. Cowan discloses in U.S. Pat. No. 3,725,747 a solenoid-actuated mechanism of a special design to obtain high armature saturation so that armature displacement (stroke) is a function of input control current. Cowan configures his solenoid by "shading" the armature to achieve his primary objective of a linear response with incremental current changes. This shading produces a great flux leakage and saturation loss by provision of a groove in the attracting end of the armature. During the stroke of the Cowan armature, there is always an air gap between the armature and its radial pole which produces a large increase in force with stroke using an underlapped armature. Cowan does not attempt to produce a flat force curve, and his minimum underlap distance is approximately the same displacement as his working stroke. The Cowan force curve is shown as FIG. 2a.

Salter in U.S. Pat. No. 4,206,781 discloses a sloped armature tip attracted by a matching sloped axial pole end to provide a constant attractive force for constant coil current The use of such axial poles is described in Rotors. The valve is single stage Brundage and Swatty disclose in U.S. Pat. No. 4,553,732 a pilot-operated flow valve that uses a concave tapered (shaded) armature end with radial poles to achieve a magnetic force which varies with position. The important part of this pilot valve is the requirement for an initial overlapping of the armature end with the attracting pole to form a magnetic spring, as further explained by Brundage in U.S. Pat. No. 4,750,704. Forces of this magnetic spring operate to oppose fluid forces which are proportional to and increase with increased flow of fluid through a pilot control element. The Brundage/Swatty force curve is shown in FIG. 2b.

Another facet of our invention concerns compensation for feed pressure variations and flow force variations. The Salter valve utilizes a pressure compensated spool to set spool position, but makes no mention of flow-induced forces Presley and Lautzenhiser in U.S. Pat. No. 4,430,846 disclose use of a pressure balanced armature in a pilot stage, but use a second compensator spool to compensate for pressure fluctuations in feed pressure The Brundage design in U.S. Pat. No. 4,553,732 would be significantly affected by radial flow forces, but no mention is made of this effect. In the main stage, spool position is said to rely only on a balance of pressure drop forces against spring forces. The effect of momentum induced forces in valves was studied by Lee & Blackburn, "Steady State Axial Forces on Control Valve Pistons", ASME Paper No. 51.A52. Aug. 7, 1951. They showed that fluid flowing through a variable radial orifice exerts a closing force on the movable member proportional to both orifice area and pressure drop through the orifice. They proposed changes in valve shape that reduced these forces in 4-way directional valves such that the servo force could overcome them, achieving accuracy by using a feedback circuit. An objective of our invention is to internally compensate for radial flow forces with a simple construction, resulting in a proportional and pressure compensated flow control over the wide range of pressures used commercially. The technical objectives of our invention are necessary for commercial success at high unit volume such as economy, linear response, repeatability, and self venting Cowan and Brundage disclose devices that must be adjusted at the time of manufacture. Brundage specifically explains that a small change in initial position of the armature end relative to the attracting pole due to combined effect of part tolerances will cause a significant change in initial magnetic force. Our solution is no initial overlap and an improved magnetic force-displacement curve which is relatively flat over the design range of movement with position so that armature position requires no adjustment.

A performance factor in such electromagnetic devices is hysteresis, defined as a measure of the degree to which the output of a device with increasing input disagrees with the output with decreasing input. Cowan describes magnetic hysteresis as an inherent metal property and mechanical hysteresis as frictional resistance acting on the armature which is reduced by using Teflon bearings. An objective of our invention is an armature that has low hysteresis under all conditions of use including use with hydraulic fluid containing high levels of particulate contamination. In our invention, we reduce hysteresis by minimizing forces that cause armature drag.

Another objective of our invention is linearity of response in controlled flow with input electrical signal variations Most of the input - output relationships are decidedly nonlinear, so an objective of the invention is to choose a special range of operation for control parameters so that nonlinearity is avoided or cancelled by exact comparison with a reverse nonlinearity.

3. SUMMARY OF THE INVENTION

The invention is a two stage valve with a magnetic circuit, pilot stage, and a main stage. The energy in this magnetic circuit is proportional to the current passing through its coil and is potentially convertible to mechanical work The circuit is designed to control the working gap by controlling the rate of energy transfer with small displacement of the attracting tip of the armature with the attracting radial pole. The attracting end of the armature has a reduced cross section to flatten the attractive force for small displacements of overlap or underlap of the armature with the attracting radial pole This force response eliminates the need to precisely adjust the position of the armature during assembly to correct for manufacturing tolerances and creates the correct response for pressure compensation in the pilot stage A force bias absorbs low levels of magnetic energy to cause the electrical-magnetic response to be linear.

The attracted end of the armature moves in concert with a pilot spool which controls the rate of pilot flow by balancing hydraulic forces with an opposing armature force above a minimum set by a biasing spring. The pilot spool has an axial metering orifice for pilot flow which generates a pressure drop which acts on the face of the spool, and radial exit passages to variably communicate with radial throttling holes. Pressure at the entrance of the pilot stage is communicated through the pilot spool and relief lands in the armature to the trailing end of the armature such that changes in feed pressure are equalized. The pilot spool is fitted with a spring biasing it toward closure with a compressive set force high enough to minimize the effect of efflux of momentum forces acting on the pilot spool end and to raise the magnetic variation to a linear range. Further increase in coil current strokes the pilot spool such that pilot flow in the top half of the pilot range is controllable in regard to feed pressure and assembly tolerances.

The main stage has a main spool with slave orifice that feeds the pilot spool while acting as a controlled element that balances pressure drop forces, spring force, and momentum forces. The main spool is configured to have fluid supply pressure face the slave axial orifice for pilot flow, and lands to control one or more radial throttling orifices to regulate the main flow A main spring biases the main spool closed and resists opening forces linearly after cracking. As coil current is applied to open the pilot throttling orifices, the force created by pressure drop of this pilot flow through the slave orifice acting on the face area of the main spool further compresses the main spring and opens the size of the main control orifices for regulated flow. Regulated flow enters axially but exits radially causing an independent momentum force generated by change in momentum of the fluid as it exits through the radial orifices which acts to close the main spool. This force is proportional to the pressure drop and area of the main throttling orifice. In the prior art, this force partially overpowered the pressure drop force on the main spool, resulting in valve output that may go up or down as inlet or feed pressure is increased. In our invention, a heavy main spring and circumferentially narrow radial orifices resulting in a longer stroke of the main spool are used to offset momentum forces such that main stage regulated flow is independent of valve pressure drop above a low minimum pressure drop.

Our invention also has features that maintain linearity and stability over a wide range of service conditions. A short tube orifice is used to control flow coefficients in the pilot metering and slave orifice to maintain linearity and improve stability when the coil is activated quickly.

A further objective of this invention is tolerance to contamination in the regulated fluid. The presence and effect of contamination reported by Inoue (Inoue Riichi *Contaminant Effects on Electrohydraulic Control Valves,* SAE Technical Paper 820649 (1982). A more recent article by Zin (Zin. Z L "Basics of Breakout Force in Spool Valves" *Hydraulics & Pneumatics,* Vol. 40, No. 5 (May 1987) describes both the effect of spool clearance on breakout force (for initial movement) and of contaminant lock of spool movement, where the effect of particulate contaminants is explained as a settling between spool and wall which requires "silting forces" to be overcome for spool movement. Inoue shows that levels of particulate contamination are moderate to high in mobile equipment, and that this contamination degrades the functioning of most electroproportional valves. Our invention cycles magnetic response and utilizes a contamination well and venting in the armature to provide high tolerance for contaminants in the working fluid.

4. DRAWINGS

Figure 2:
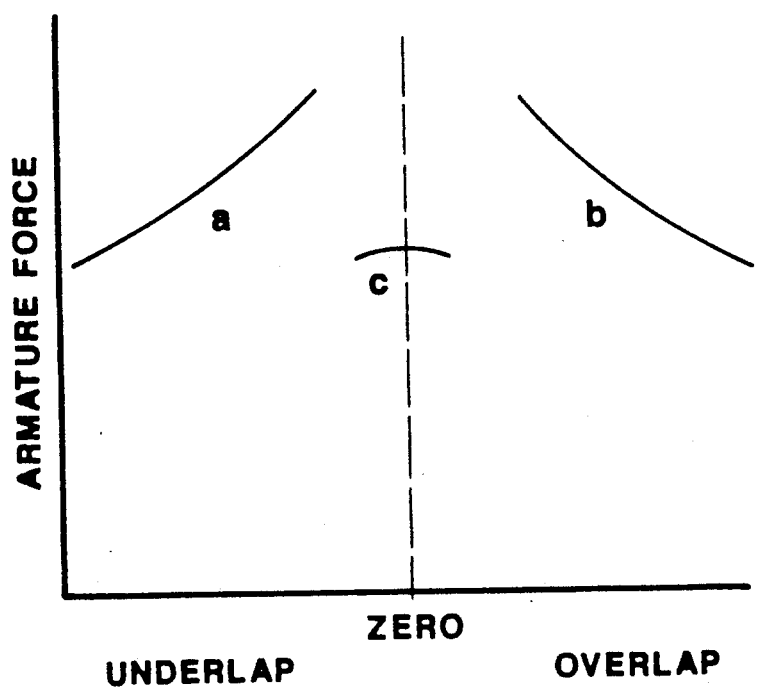
Figure 3:
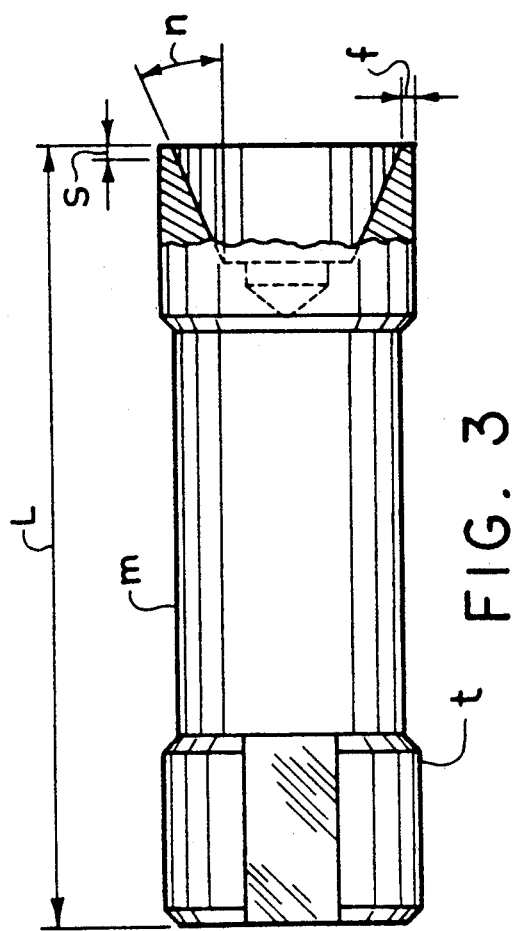
Figure 3A:
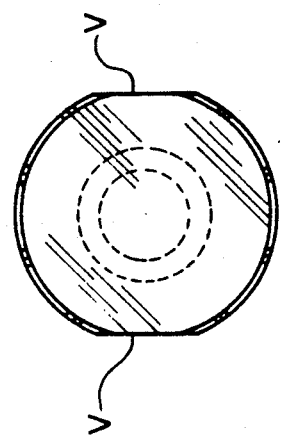
Figure 4:
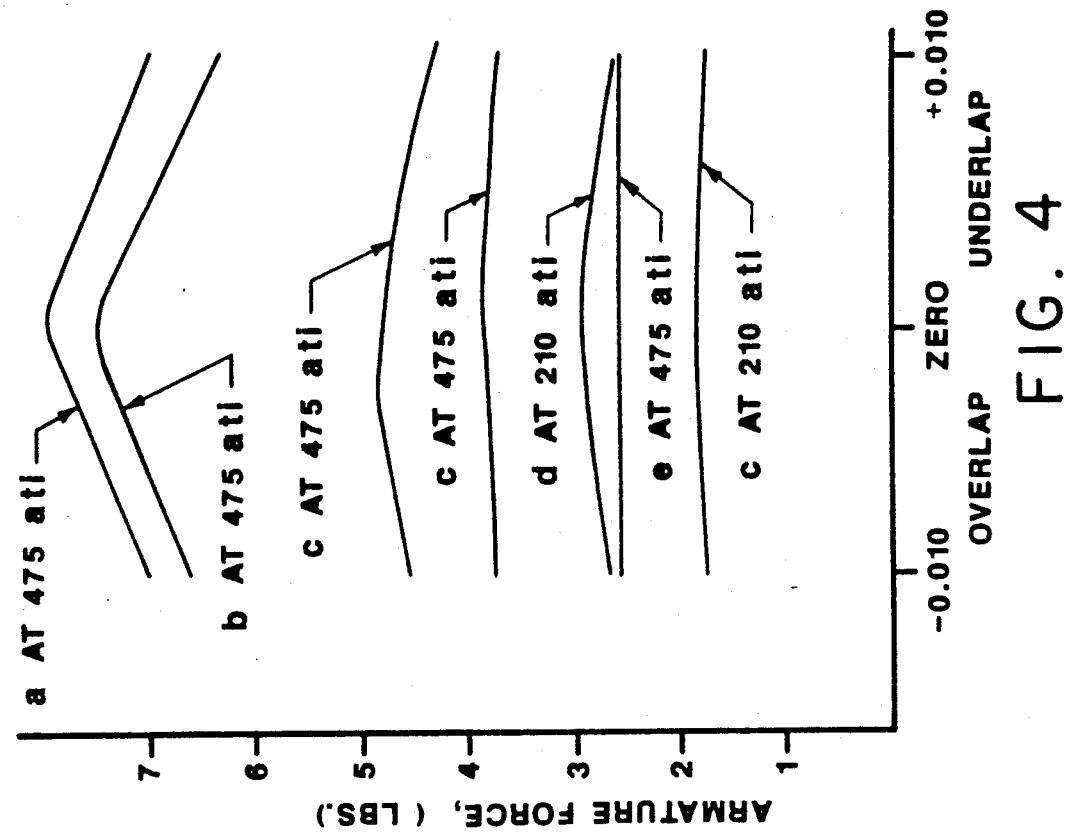
Figure 5:
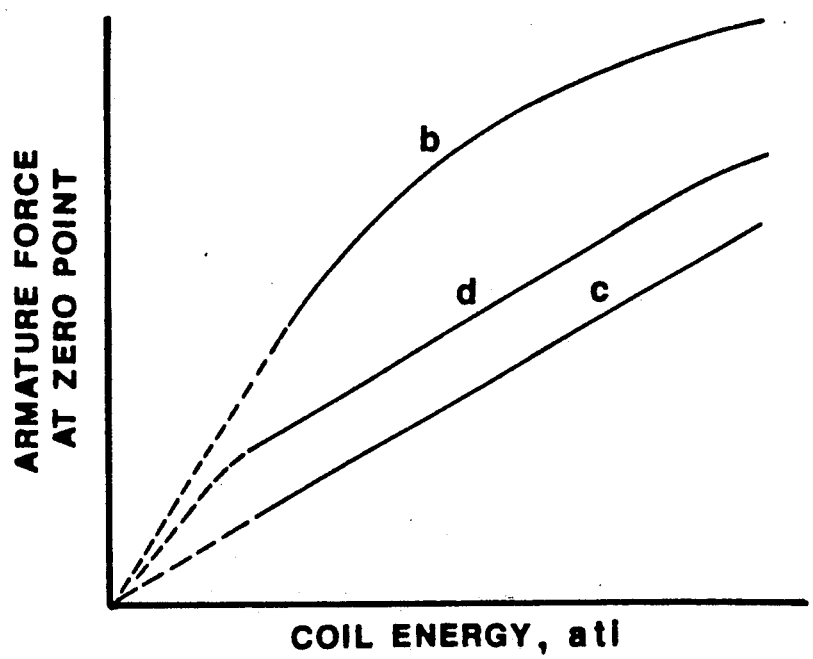
Figure 6:
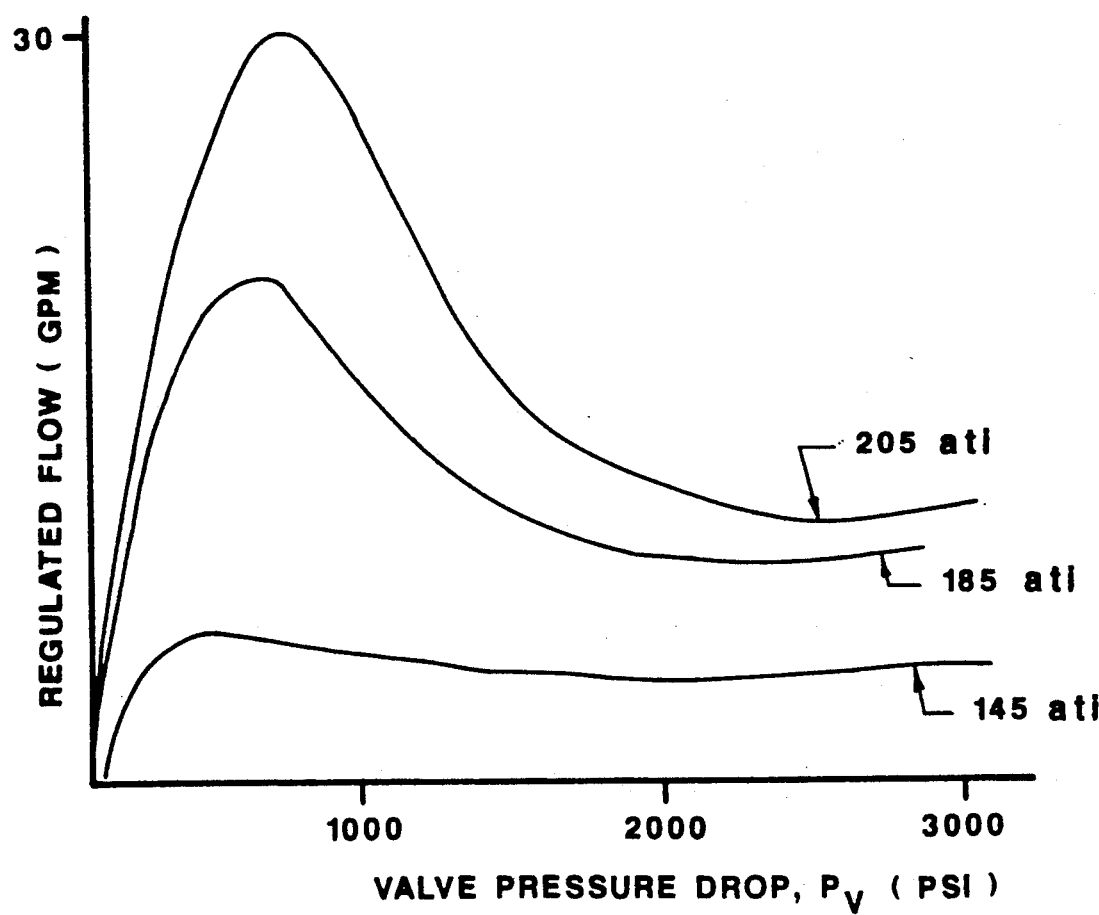
Figure 7:
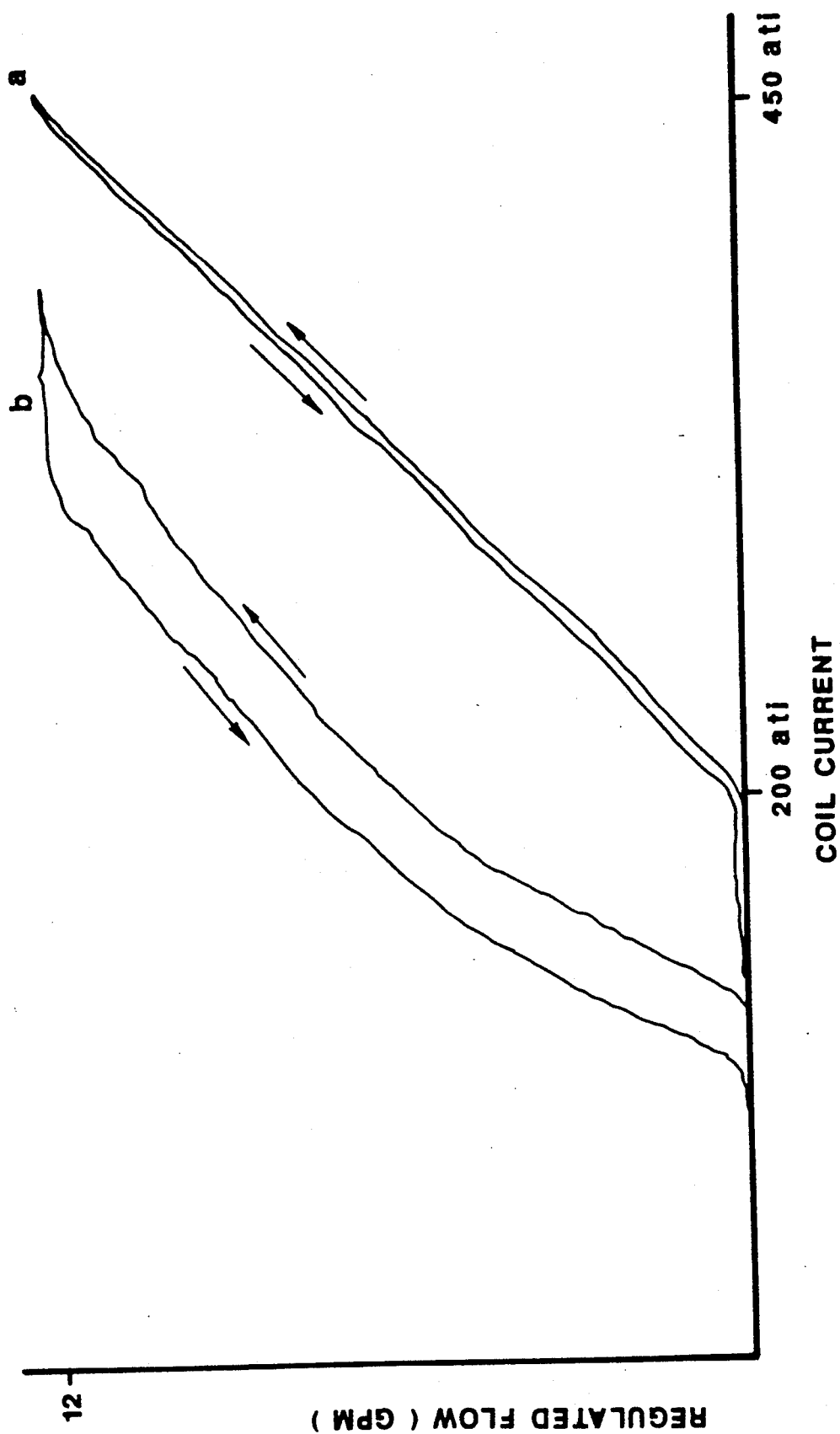
Figure 8:
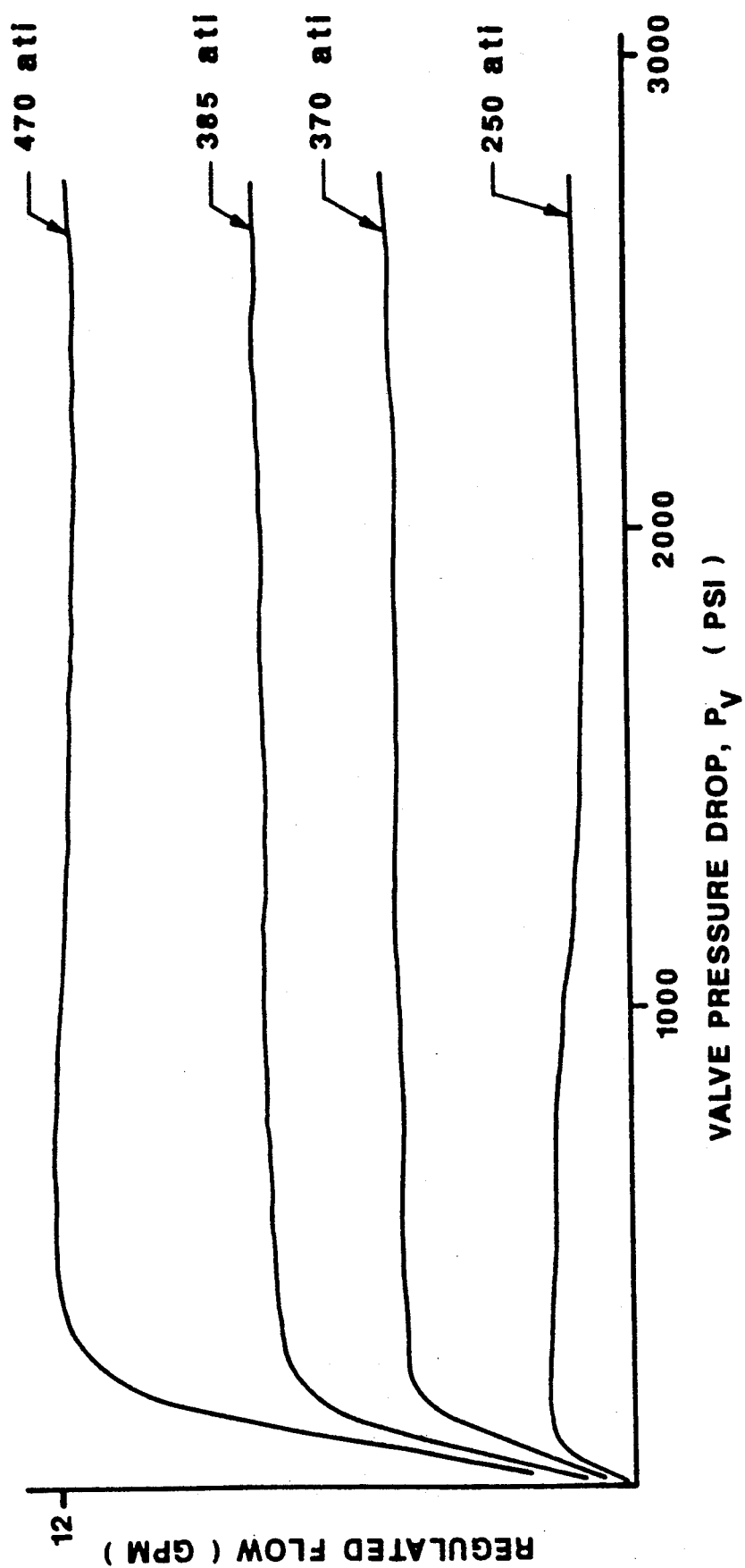
Figure 9:
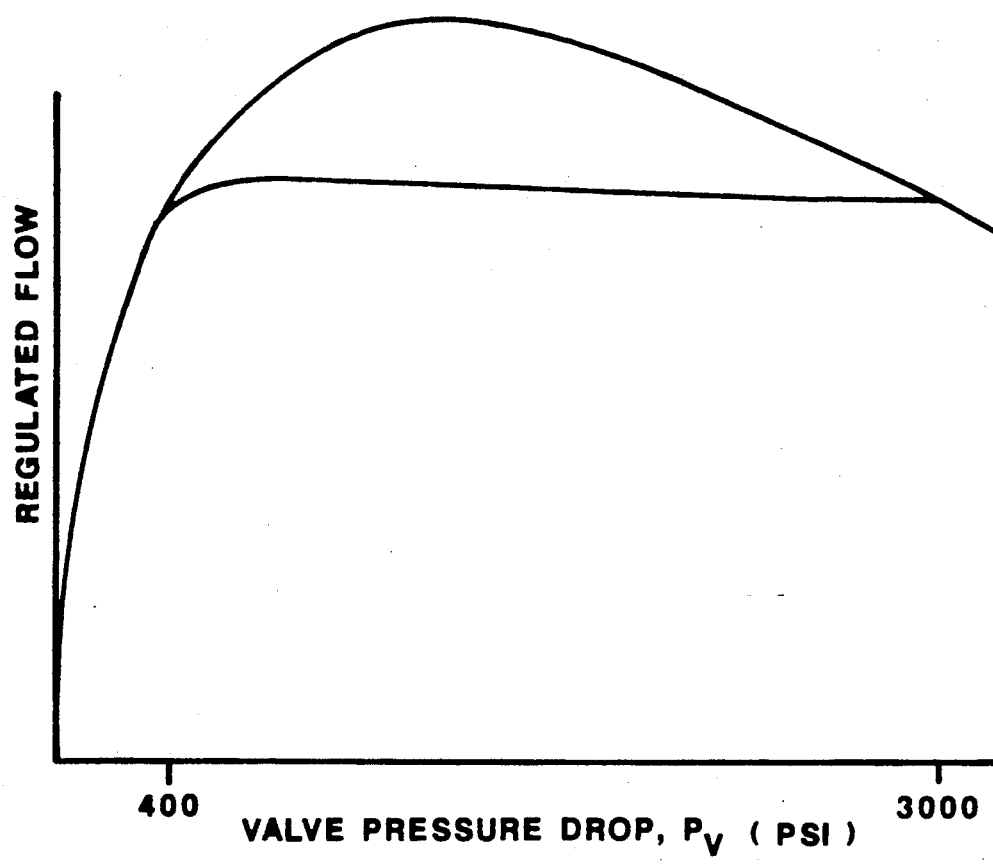

The invention may take form with different parts and arrangement of parts, with preferred embodiments described in accompanying drawings which form a part of this application. These are:

FIG. 1: Side view of valve; 1A view of regulated ports;
FIG. 2: Armature force curves; a—Cowan. b—Brundage, c—Invention;
FIG. 3: Armature detail;
FIG. 3A: Armature end view;
FIG. 4: Detailed armature force displacement curves;
FIG. 5: Armature force vs coil energy;
FIG. 6: Simple valve without momentum force control;
FIG. 7: Valve flow vs current to show linearity and low hysteresis;
FIG. 8: Valve flow vs pressure drop to show dynamic balance.
FIG. 9: Hydraulic Feed back Factor
FIG. 10: Pilot Flow vs. coil energy

5. DESCRIPTION OF PREFERRED EMBODIMENT

Pilot Stage and Magnetic Circuit

FIG. 1 shows an electromagnetically and hydraulically controlled valve with a tube assembly composed of radial attracting pole (11), pole separator (12) and radial trailing pole (13). Tube section 11, 12, and 13 are joined by brazing of overlapping joints, outside bead welding of overlapping joints, or welding of butt joints. The mating end of section 11 with hex nut 15 is threaded to match corresponding thread in hex 15 and sealed with Oring 4. Alternatively, Sections 11, 12, 13 and hex 15 may be made as one subassembly with proper machining control. An armature (6) slides within sections 12 and 13 with the trailing end spaced from end cap 17 by nonmagnetic spacer 18. Magnetic flux is generated in this magnetic circuit by passing current through multiple copper windings of coil 19 to spade terminals 1. A coil can 9, washer 8, end cap 7, and hex nut 15, capture magnetic flux in an outer magnetic loop. The inner magnetic loop is made up of trailing pole 13, a fixed insignificant air gap between pole 13 and armature 6, armature 6 itself, a working gap 20 between armature 6 and attracting pole 11, and pole 11 itself. The inner and outer magnetic loops comprise the magnetic circuit. As magnetic flux traverses working gap 20, energy is dissipated and a force proportional to current is generated to pull armature 6 toward pole 11. A force transfer element 22 transmits this force from the magnetic circuit to the pilot stage by acting on pilot spool 21.

The hydraulic part of the pilot stage is based on pilot spool 21 sliding within pilot housing 14 and biased towards closing by pilot spring 23 held in place by snap ring 24. Pilot spool 21 has grooves cut as at 33 to trap contaminants and improve sliding action. Pilot spool 21 is hollow with an internal chamber d connecting through crossbore 25 past snap ring 24 to e at the feed side of armature 6. The feed end of chamber d is closed by a tight fit of disc 32 with spool 21 except for pilot metering orifice 28. Orifice 28 is a short tube type with length longer than diameter, with orifices dimensions changeable by changing disc 32. Multiple side passages 30 enable fluid to move from chamber d to groove g, which communicates with pilot throttling ports 29 depending on the position of spool 21. Fluid feed to the pilot chamber d flows from (a) through orifice 57, chamber b, orifice 70, screen 14 and chamber c at a rate jointly controlled by the area of ports 29 and system pressure at a, being influenced by the pressure drop through orifices 57, 70, 30. The control length of pilot spool 21 for a normally closed valve is from metering edge 36 to force end 34, and for a normally open valve from metering edge 36 to force end 34. Pilot spool 21 has a positive closed position independent of pressure determined by the combined length of control length 32-34, the lengths of elements 18 and 22, and the length of armature 6.

Pilot spool 21, main spool 53, pilot housing 14 and main housing 51 are all manufactured from steel with carbon content of 0.10-0.20%. Spools 21 and 53 are hardened by conventional means of a carburizing treatment at a temperature of 1800° F. Hardness is measured by conventional means using the Rockwell C scale (Rc), with spool Rc of 55 at the surface and to a depth of 0.005″. Spools 21 and 53 are ground to final outside dimensions after hardening such that even though 0.001-0.005″ may be removed in grinding, the finished spool has a surface Rc of 55 Housings 14 and 51 are hardened to Rc of 55 in a similar manner before honing, or may be honed when soft, to their finished interior diameter. The honed housings 14 and 51 are then hardened by carbonitriding in an atmosphere of ammonia and hydrocarbon gases at a temperature below 1000° F. to eliminate distortion. The epsilon crystal carbonitride formed is less brittle than nitride alone while retaining a high Rc of 65 or higher as disclosed by Ross in U.S. Pat. No. 4,461,656. This method has previously been used for treating tools to resist abrasive wear, whereas in our invention it is used to attain Rc of the housing without distortion to a level significantly higher than Rc of the mating spool In proportional valves of prior art, spool Rc is 50-55 while the mating housing Rc typically is 35-45 or in some cases less than Rc of 10. This higher hardness of the housing achieved with nil distortion is believed unique in the art and contributes to the low hysteresis of the valve.

Detail of the armature design is shown in FIGS. 3 and 3a. The characteristics of this armature and their function in the invention are as follows:

(s) is the attracted section of the armature which determines the rate of energy transfer in the working gap 20 up to 500 ampere turns;

(f) is the end face which with cone angle (n) jointly determines the force characteristics with armature displacement, (f) of 0.030″-0.040″, and (n) is 0 to 18 degrees;

(m) is the contamination well, formed by a relief of 0.020-0.030″ with the inside diameter of pole 13 to provide a volume to hold particulate contaminants;

(t) is the trailing section which contacts trailing pole 13 and passes the flux lines of the magnetic circuit across a fixed (nonworking) air gap of 0.001″, the length of (t) being typically 0.20″ to 40″;

(l) is the full length of the armature controlling its position relative to the junction of sections 11 and 12 (the zero point);

(v) are vent lands machined symmetrically along the outside diameter of the armature in the (s) and (t) sections to provide effective venting of vapor from h and to equalize feed pressure fluctuations to h from e. The radial depth of the vent land is slightly less than face f, or 0.020″-0.030″.

Pilot spool 21 slides within pilot housing 27 at close spacing when acted on by armature force transmitted through element 22 and resisted by the spring force of pilot spring 23. Fluid enters the pilot spool 21 from the main stage after passing through a jet diffusion orifice 70, screen 14 and interstage chambers b and c. The metering orifice is actually a short tube with length greater than diameter. Preferred diameter is 0.060-0.065″, and length is 0.070-0.130″. Pilot flow passes through metering orifice 28 changes direction in chamber d and then exits through the radial throttling ports 29. Fluid pressure in the pilot stage chamber is equalized to the wet armature through bore 26 to (e), and through vent lands v to (h) This pressure equalization is maintained by using two vent lands v so that pressure itself does not affect the force balance on pilot spool 21.

MAIN STAGE

The main stage housing 51 is generally cylindrical and open at both ends with regulating ports 52 symmetrically spaced in the wall of the housing. Main spool 53 slides within the main housing with close spacing, and is generally hollow containing main spring 54 which seats against spring end 55 at one end and spool endwall 56 at the other end, such that the set force of the spring will hold the spool so as to overlap regulating ports 52 and thus close these ports. The spool endwall separates main regulated flow from the pilot section, except for slave orifice 57 through which pilot flow passes. Slave orifice 57 is a short tube with length less than diameter; diameter is 0.041" and length is 0.035 ".

In simple form spool endwall 56 is the general inlet end of main spool 53. In the high pressure embodiment, a balanced spool is formed by addition of a balancing section 58 with outer diameter closely spaced to the inside of main housing 51, and a connecting section smaller than main housing 51 to form groove 60, with groove 60 communicating to feed (a) through radial orifices 59 through which all main flow passes For either case fluid enters axially through an entrance chamber (a) and then changes direction to exit radially through regulating ports 52. The rate of exit is controlled by the amount of underlap of main spool 53 relative to regulating ports 52.

The control length of spool 57 is the distance from boss 64 to regulating edge 63, which is the same for normally open or normally closed control. The position of spool 53 is determined by pilot flow rate through slave orifice 57 the spring constant and compressive set of main spring 54, and a momentum force generated by main fluid flowing radially against the endwall 56 and edge 63. Main housing 51 can be separate as shown or machined as one piece with pilot housing 14, subject to proper machining control. Threads 5 hold the solenoid assembly in place and also hold pilot housing 27 and main housing 51 in a cavity in Body B matched with clearance. Orings 2 seal hex nut 15 against a mating boss in body B by the force of tightening mating threads 5. Positive placement of the main housing in its cavity is determined by the combined length of housings 51 and 14. Main housing 51 is sealed in the cavity by the set of Oring 68 with backing 66 and the set of Oring 67 with backing 69. Spring end 55 is held against housing 51 with spacers 71 and 72, which also support screen 14. The set of Oring 81 and backing 82 seals pilot housing 27 in the cavity, and housing 51 in place. Pilot spool 21 and main spool 54 are fitted to their mating housings with a diametrial clearance less than 0.0005" to minimize potential of hydraulic lock as reviewed by Zin (op cit) A small force on the housing can cause a small deflection under 0.0002" that will tend to bind the spool in the housing such as when overtorquing hex 15 against threads 5. Differential expansion due to temperature of valve cartridge compared to body cavity can also cause small deflections. The effect of these practical imperfections is eliminated by having both pilot housing 14 and main housing 51 float within the cavity, meaning that those housings are free to move while sealed by Orings. The clearance tolerance for housing to cavity is greater than 0.002", or more than ten times the level which would cause spool binding. Construction as shown makes valve operation independent of tolerance variance in cavity dimensions dimension changes with temperature, and excessive torque on the hex nut.

Body M is shown to illustrate installation and fluid ports FP is the feed port at system pressure, WP is the work port to the controlled load when metering in. When metering out, FP is the work port and WP acts as tank port for regulated flow. TP is the tank port for pilot flow.

CONTROL RELATIONSHIPS IN MAGNETIC CIRCUIT

Magnetic permeability is a measure of the capability to conduct lines of magnetic force (flux density) when subjected to a magnetic field intensity (measured in ampere turns per inch of coil length). Magnetic properties have been well characterized for many years, and are summarized in Rotors (op cit). All iron and common steels are magnetically permeability with flux density response dependent on impurities. Stainless steels containing nickel and chrome crystallize in a manner that prevents alignment of a magnetic field. Commercial stainless steels have about 0.10% carbon, which will cause a low degree of magnetic flux under influence of a magnetic field. This tendency does not significantly affect our invention so these materials are herein referred to as simply nonmagnetic. A popular ferromagnetic material in prior art is low carbon iron, specially produced at less than 0.01% carbon, formed into the shape desired for the magnetic circuit and then annealed so that the iron has large crystal structure. This prior art strives to produce maximum flux density at a low current.

The objective in our invention is to produce a flux density that is linear with current by using carbon steel with about 0.15% carbon and operating at a flux density above the well known "knee" in the magnetization curve. Magnetization above this knee is commonly referred to as magnetic saturation, which is not completely accurate. The geometry of armature section s plus working gap 20 causes a unit increase in current above the knee to produce a unit increase in flux density in linear relationship. When using a common grade of steel with 0.15% carbon, this knee occurs at about 150 ampere turns per inch (ati). In the range of 200-500 ati, the generation of incremental magnetic flux density is linear with an incremental increase in coil current. The use of 0.15% carbon steel will not result in creation of a permanent magnetism under extended use. Some short term residual magnetism does develop during use in armature 6, but affects force output only below 100 ati and thus has no effect over the control range of the valve.

The requirement of our magnetic circuit is to generate a force vs. current curve that matches the hydraulic requirements of the pilot stage. Pilot spring 23 has initial compression such as to absorb the first increment of force generated by the magnetic circuit below 150 ati. One concern was that spring 23 positioned with spool 21 would cause an uncontrollable second attracting force to armature 6. Some magnetic flux does drain through this path, but this drain is constant at any coil current and does not affect the rate of change of magnetic flux in working gap 20.

Other objectives of the invention are included to enable mass production of valves with uniform performance for commercial success. One such objective is elimination of adjustment means, such as a screw, to determine the starting position of the armature. Another objective is to minimize the drag or locking effect of particulate contaminants present in equipment particularly in mobile equipment. Another objective is to have a unit which vents itself of the air present at startup. If this air is trapped at (h), it will cause the valve to misfunction. All of these objective are met at low cost by using the armature of FIG. 3.

The wide cross section of the armature captures the magnetic flux in the inner loop and the external can and end cap capture magnetic flux in the outer loop. Overlap of the armature with the trailing pole is constant so these parts of the magnetic circuit have high permanence at all levels of coil current. The one part of the circuit where a majority of the lines of flux is not captured is the working gap 20 between the end of attracting pole 11 and attracted section S of armature 6. Working gap 20 is the control mechanism which converts potential magnetic energy to mechanical work, defined as a force moving through a distance.

An empirical method that measures armature force was used to measure variation of armature force with displacement at constant current, shown in the curves of FIG. 4. In these curves the zero point is defined in FIG. 1 as the junction of the radial pole (11) with the pole separator (12). Negative displacement (or underlap) in the measurement apparatus is to the viewer's left of zero and armature overlap to the right. These curves are shown on the same graph to demonstrate the difference in characteristics of the working gap 20. They were measured with a coil of 970 turns wound on a core 1.80" long, such that a current of 1 amp is equivalent to 528 ati. Force-displacement curves for the armatures of prior art are shown at 475 ati for comparison with our preferred embodiment to show the difference in force level and force change with displacement. Curve 4a is for a blunt armature, and 4b is for an armature with a 30 degree shading angle. The curves show a steep variation with position of 70-100 lbs/in. The range between curve 4a and 4b shows the force response for shading angles of 30-90 degrees in prior art. The preferred curves in accordance with the invention is partially dependent on the required pilot flow rate for hydraulic gain as described later. For the 0-10 gpm valve specified in FIG. 1, section a has angle n of 9 degrees a flat f of 0.33" and a force displacement variation as shown in curve 4c" Force displacement curves for preferred embodiments are described with force-displacement Kz for the region +/−0.005" of the zero point Kz for curve 4c is 10 lbs/in and is the same in the control range of 200-500 ati.

As shown by the curves of FIG. 4, reducing the angle n lowers the maximum force while substantially flattening the force displacement curve.

For higher hydraulic gain used in valves with larger regulated flow, a more powerful armature is needed. For a 30 gpm valve, armature 6 has angle n of 18 degrees and flat f of 0.030" providing a higher force as shown in curves 4d with a Kz of 25 lb/in. For this stronger armature, the variation +/−0.005" of the zero point is higher but less than for prior art 4a and 4b. As shading angle n is reduced magnetic work in the working air gap is improved by increasing face f (n). The preferred embodiment of angle n of 9 degrees and face f of 0.030" is chosen for the flatness of the curve and match with the force requirements of the pilot stage. Curve 4e for angle n of nil and face f of 0.050" exhibits the flattest curve with Kz 2 lb/in., but is too weak to balance pilot hydraulic forces. Some slope in the shaded section is desired, and the range of angle n in our invention is 2-18 degrees. The use of a significant face f of 0.030-0.040" minimizes the effect of manufacturing tolerance on the magnetic force curve.

Armatures of the preferred embodiment achieve a flat force-displacement curve by controlling the rate of change of permanence dP with incremental displacement dx in working gap 20 compared to the average strength of the magnetomotive force over that same incremental displacement dx. At the zero point, magnetomotive flux density is high, but dP/dx is also high. Magnetomotive flux density falls faster than dP/dx at displacement of section s on either side of the zero point, but the effect is slight within +/− 0.005". This preferred embodiment creates a zone of desirable force variation +/−0.005" of the zero point, with high force relative to ati, in contrast to prior art which considered use near the zero point as uncontrollable and unuseable.

In our invention leakage of magnetic flux through force transfer element 22 does not affect magnetomotive force created across working gap 20 even if magnetically permeable steel is used for element 22, in contrast to prior art.

The second benefit of this preferred embodiment is the linearity of force change with ati change or coil current, as shown in FIG. 5. The linear force curve with ati of the invention is shown compared to the force curve of prior art with 30-90 degree shading.

In this magnetic circuit electrical energy is converted and stored as magnetic energy, or dissipated as magnetic hysteresis. This conversion is inherently time dependent, being slowed by the inductance of the coil that delays current change.

Magnetic response with current change is generated with a pulse width modulated (PWM) current source to lower both magnetic and mechanical hysteresis PWM controllers generate a direct current signal at a fixed frequency and control average current by adjusting the width of each pulse. At low or high PWM frequency magnetic hysteresis is reduced. At the preferred range for our valve (60-100 Hz) the pulse frequency is sufficient to cause a micro-movement of the pilot spool about its average position. This movement reduces mechanical hysteresis without significantly affecting the pilot spool force balance. In accordance with the invention operating with section s of armature 6 in close proximity to pole 11 reduces hysteresis. Operation beyond +/−0.010" displacement cause hysteresis to increase with such increase higher for overlap of section s with pole 11 than for underlap. This benefit is explained by the relative flux leakage in working gap 20. At the zero point, flux leakage is the lowest possible for the preferred embodiment and increases only slightly for small displacement as overlap or underlap. Magnetic leakage from the side of the armature section s increases with displacement of section s from the zero point, and side pull is strongly related to side leakage. If the armature is truly round and suspended in the center of the tube sections by Teflon bushings as in prior art, side pull is distributed 360 degrees and cancels out. In practice without expensive bushings side pull causes a drag force which is over 20 times normal frictional drag. Thus, in our invention hysteresis is reduced by reducing side magnetic leakage instead of using thick nonmagnetic coatings or bushings, or bearings as in prior art.

PILOT STAGE OPERATION

At nil coil current feed pressure at (a) is transmitted through slave orifice 57, chamber b, orifice 70, chamber c, orifice 28, chamber d, passage 25 past snap ring 24 to (e) at the nose of the armature. Pressure will be equalized through vapor liquid lands (v) to (h) at the trailing end of the armature. Thus, feed pressure is equalized at no flow. For pilot flow pressure variations are equalized except for pressure drops in orifices 57, 70 and 28 resulting from pilot flow.

The magnetic circuit when energized moves pilot spool 21 to open pilot throttling ports 29. With lower pressure at tank pot TP outside throttling ports 29 than at feed port FP, fluid pressure at (a) will cause flow through the pilot circuit when the armature force is sufficient to overcome pilot spring 23 force and shift pilot spool 21 to open throttling ports 29. The pressure drop from (a) to TP causes pilot flow, while pilot flow through orifices 57, 70 and 28 consumes some of the available feed pressure. The size and number of the throttling ports 29 is used to balance the pilot stage as follows. Because any pressure at (c) is equalized to (e) and (w), and because the pressure drop through bore 30 is radial, axial hydraulic force on pilot spool 21 is the algebraic sum of the pressure drop forces through the metering orifice 28 (acting on the pilot spool) and smaller change of momentum forces at throttling ports 29. Armature forces must balance pressure drop and pilot spring forces. Any increase in the armature force from increasing coil current will increase pilot flow and the pressure drop forces on the pilot spool which combined with the pilot spring force will equal the higher armature force at a new equilibrium spool position and pilot flow. Use of four each 0.040" diameter parts 29 is preferred for short corrective pilot stroke to changes in feed pressure If the armature force curve is flat the combination of a pressure balanced armature radial throttling ports, and a pilot spool force balance primarily dependent on pilot flow enables the pilot stage to be pressure compensated, except for momentum forces, If the pilot stage is operating at any given balance of coil current and pilot flow and the feed pressure increases pilot spool 21 will stroke toward closing, reducing the size of throttling ports 29 and pilot flow would remain the same if the armature force is unchanged. The pilot spool position and armature position are directly linked. If the armature force curve varies significantly with position the armature force will vary as the pilot spool 21 strokes to accommodate pressure changes and pilot flow will change. Armature force change with spool 21 position is minimized in our invention. Armature force constant $K_g$ is equivalent to 10 lbs/in typically or 25 lbs/in maximum.

Another force requiring consideration in the pilot spool balance are change-of-momentum forces which increase with pressure drop through throttling ports 29 and act as an axial force to close pilot spool 21. Momentum forces are directly proportional to pressure drop across the pilot throttling ports 29, typically 2.000–2,500 psi. A pilot spring with constant of 2.5 lbs/in is used, with a set force of 0.7 to 2 lbs. The momentum force is 0.2–0.3 lbs at a throttling drop of 2,500 psi for the pilot flow in the control range. The effect of momentum forces in the pilot stage on the control of main stage regulated flow is described in a later section.

The resolution of the pilot stage is best understood by a quantitative review of pilot stroke at high and low pressure. In the preferred embodiment, a coil of 1750 turns is powered by a 24 volt source to move an armature 0.50 inches in diameter pilot stroke necessary to overcome the compressive set force of pilot spring 23 is the same at high or low system pressure. This stroke requires 120 ati to overcome a 20 oz set force plus a small additional increment to stroke pilot spool 21 about 0.005" to over come its sealing overlap with pilot housing 14. At 2500 psi, section S of armature 6 is 0.003 to 0.008" in underlap to the zero point, including manufacturing tolerances. A further increase in coil ati strokes pilot spool 21 to increase pilot flow. Total pilot stroke in the control range using two throttling ports 29 of 0.040" diameter is under 0.003" at a throttling drop of 2400 psi so section s of armature 6 stays within 0.005" of the zero point and exhibits the low hysteresis described in the magnetic circuit.

For valves operating only in low pressure systems, a longer force element 22 is used to set section s of armature 6 at 010" underlap to the zero point. The stroke to overcome compressive set and overlap of pilot spool 21 is still 0.005" so the control stroke starts at 0.005" compared to zero point. Control stroke at 250 psi throttling drop is about 0.012" using four regulating ports 29 of 0.040" diameter, such that it is centered about the zero point and again exhibits the low hysteresis of this advantageous position. The pilot stroke in this control segment is very short compared to the pressure drop forces generated, equivalent to a force/displacement constant of about 1,000 lbs/in at 2,500 psi and about 400 lbs/in at 250 psi. This change with hydraulic position, or hydraulic constant is much more powerful than the armature force constants $K_z$ so the balance of pilot spool 21 is the armature force constants $K_z$ so the balance of pilot spool 21 is instantaneously maintained whether section s is slightly underlapped, even with, or slightly overlapped with pole 11, in contrast to the prior art of Brundage.

Because our invention is an open loop control without electronic feedback as in prior art, pilot spool 21 must move in very small increments to continually adjust its force balance. Micromovement resulting from modulation of coil current, as previously described, improves the positional resolution of spool 21. The sliding action of a finished spool 21 with Rc of 55 against honed housing 14 with Rc of 65 in the presence of hydraulic fluid with current modulation lowers stick slip action and eliminates hydraulic lock. ( A similar benefit is seen with main spool 53 sliding in housing 51.) Even as operating temperature increases and fluid viscosity is reduced to 6 centistrokes (from a normal level of 20.40 centistokes) stick slip action is not seen. Besides particulate contamination, vapor contamination can occur in systems to the extent that a normally brown hydraulic fluid appears white because of the presence of vapor bubbles that account for a significant volume fraction of the working fluid. The use of two vent lands v instantly enables any vapor accumulation from e to h in the armature section to be purged, and eliminates need for a purge opening as in prior art. Under the most severe conditions of low fluid viscosity with high particulate contamination that causes a valve of prior art to cease functioning because of spool lock, our valve functions normally with only a moderate increase in hysteresis.

The design of the pilot stage in our invention controls the flow coefficient through metering orifice 28 by using a short tube orifice where the length (L) of the orifice is greater than its diameter (D) The flow coefficient is a factor that indicates the amount of pressure that is lost in flow through the orifice For a coefficient of 0.3, 70% of pressure drop is lost as energy (dissipated as heat); while for a coefficient of 0.8 only 20% of pressure drop is dissipated. The flow coefficient for an orifice is dependent on the ratio of inertia to viscous forces acting on the fluid, commonly measured as the Reynolds Number (R). The variation of flow coefficient in a short tube orifice with L/D greater than unity for values of R below 1200 is linear and stable. The well known correlation for pressure drop (dp measured in head of fluid) through an orifice is as follows:

$$dp = (Q/CA)/2gc/$$

Q = flow rate

A = orifice area
C = flow coefficient
gc = constant = 32.2 ft/sec/sec

A control objective to improve resolution in the pilot stage is to spread the range of flow coefficient to counter the exponential relationship of dp with pilot flow For the rate of pilot flow used in an orifice 28 of 0.060"–0.065" diameter and 0.090" length, the flow coefficient is about 0.3 at 0.20 gpm and about 0.6 at 0.42 pgm. This change in coefficient provides better resolution at high pilot flow by dissipating less energy. This novel design partially overcomes the balance problem of using linear armature force with nonlinear pressure drop force in the pilot stage.

MAIN STAGE OPERATION

In the preferred embodiment slave orifice 57 is in series with and upstream of the pilot stage If pilot flow is commenced as described in the pilot stage section, part of the total pressure drop in the pilot circuit will be generated through slave orifice 57 causing a pressure drop force (slave force) which acts on the radial face of main spool 53. Increasing pilot flow will increase this slave force Fd until main spring 54 set force is overcome and main spool 53 strokes further than its sealing overlap to underlap regulating ports 52. Main flow will then commence out of orifices 52 and will increase as increasing pilot flow strokes main spool 53 to greater underlap. Regulated flow rate through the main stage is controlled by the position of main spool 53 relative to the regulating ports 52. The position of spool 53 is controlled by the pressure drop force (Fd) of pilot flow through the main stage slave orifice, the opposing main spring force (Fs), and the forces generated by a change in momentum of the fluid as it exits the valve (Fm). Fd and Fs are opposed, and their interaction commonly understood by practitioners in this art. Fm acts to close the main spool and is thus in opposition to Fd, i.e. Fd = Fs + Fm when the main spool is in balance. Fm is not commonly understood by practitioners in this art.

In a valve of prior art (Brundage & Swatty) improved by reducing hydraulic gain but without compensation of momentum forces, Fm dominates at high pressure to close the main spool. Such an effect is shown in FIG. 6, where regulated flow is plotted as a dependent variable against valve pressure drop at several levels of constant coil current In this valve, the main spool is 0.625" diameter with pilot flow passing through a slave orifice of 0.041" diameter to balance a main spring with a constant of 73 lb/in. Two regulating ports are square, each having a axial length of 0.250" and a circumferential width of 0.250", so total width is double maximum valve stroke. Note that with constant coil current in the high end of the control range, flow varies greatly: 18 gpm at 300 psi pressure drop, 28 gpm at 750 psi, and 15 gpm at 1500 psi. The output of this type of valve is not practically controllable nor predictable.

The design of our invention uses a main spring with a constant that is high compared to the rate of regulated flow and the axial area of the main spool. In particular our design uses regulating ports with both a much smaller and variable circumferential width than has ever been used heretofore in combination with a longer port to obtain the necessary port area to improve control and resolution. Our invention causes the main spool position to close with increasing pressure drop across the regulating ports to maintain a constant regulated flow by using a special force balance as follows Fs is linear with spring compression after overcoming spring set force. Compressibility effects of the fluid are nil, and rotational energy is small compared to total flow energy. Lee/Blackburn reported that Fm acting to close the spool is equal to a constant times the control area (Av) times the pressure drop across the valve (Pv):

Fm = K' w Av Pv for rectangular orifice with width w; K' = constant.

Figure 1A:
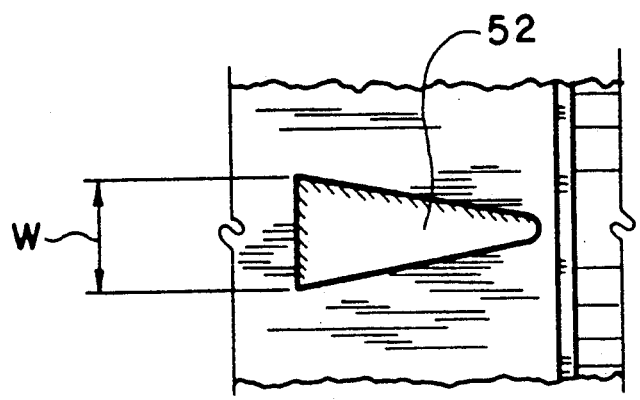

As Pv increases, momentum forces increase linearly, as does the tendency toward instability. Blackburn defines a feedback factor as the ratio of the Bernoulli spring rate to the mechanical spring rate (Blackburn, J F et al Fluid Power Control, John Wiley & sons, NYC, 1960). The Bernoulli spring rate is a quantitative measure of the forces caused by the change in momentum of fluid as it changes direction to exit the valve. The Bernoulli spring rate is dependent on the flow constant through the regulating port width of regulating port, and pressure drop across the valve. The mechanical spring constant is well known Blackburn defines a feedback factor Tau, as the Bernoulli spring rate/mechanical spring constant, or Tau = 0.45 w Pv/Ks w—regulating port width
Pv—pressure drop across regulating port
Ks—mechanical spring constant In accordance with our invention we have taken this feedback factor Tau and added the capability to adjust for pressure variations. We use a mechanical spring with Ks tailored to the typical high pressure (3000 psi) or low pressure (300 psi) system. A design constraint is that Ks is fixed being the same at 100% of maximum regulated flow as at 5%. By recognizing that width w of Blackburn is actually the reduced expression for rate of area change of regulated ports with stroke x (or xw/x) if regulated ports are rectangular, we use (near) trapezoidal ports to change the rate of area gain with stroke. In our invention the rate of area gain must increase as regulating port area increases, so regulating port width set by the metering edge of main spool increases with stroke of the main spool. Referring to FIG. 1a, regulating ports 52 are formed with a semicircular shape with radius 0.010" at low stroke to give fine control at less than 3% maximum regulated flow. Width w increases from a diameter of 0.020" at 0.010" stroke to 0.090" at 0.190" stroke, such that width w from 3% to 100% regulated flow shows a variable area gain of 0.020x at low stroke to 0.090x at high stroke. The variable area gain enables a constant Ks to be used as mechanical feedback for both high and low flow rates. The constant 0.45 used by Blackburn actually varies from 0.43 to 0.54, but the high values are for low stroke under 0.010", so an average value of 0.45 has low error in our valve.

The force balance will first be explained physically. At any solenoid current Fd is constant and forces on the main spool are in balance, so a change in Pv would cause Fm to change and cause a new force balance and regulated flow to change. The only force change available at constant current to balance a change in Fm is Fs, since as the main spool is urged to close by Fm (destrokes), the main spring will be less compressed, and Fs will decrease. As the main spool closes, Av is reduced so Fm is concurrently reduced, with this response occurring instantaneously with the change in Pv. For a Pv increase, the main spool will close to create a new balance of Fm and Fs with Fd, Fd being unchanged, Fm increased, and Fs decreased.

In accordance with our invention, we use the feedback factor described by Blackburn with a special design of regulating orifice and a main spring constant to ideally compensate regulated flow for changes in feed pressure, and required load pressure. Our design includes a main spring rate that is very high compared to main spool weight to provide excellent stability in an open loop system. The design parameters for service with high system pressure (3,000 psi) are a main spring 54 rate that is high compared to main spool 53 regulated flow, regulating port 52 width that is variable such that the stroke of main spool 53 is longer compared to prior a for a given regulated flow rate.

On the first requirement an advantage of pilot operation is that a strong main spring can be used. In the preferred embodiment for a 0-10 gpm valve, the main spring has a 50 lb/in. The length of the regulating port is 0.200", with the width varying from 0.020" at low stroke to 0.090" at maximum stroke as shown in FIG 1A. In a proportional valve maximum regulated flow is dependent on the size of regulating ports, and main spool diameter, while main spring K determines the value of Fs to balance Fd. In a typical 4-way valve of prior art with a 0.625" diameter spool (0.307 sq in), the main spring K is under 50 lb/in and the spool stroke is about 0.200". The two regulating ports in the prior art of Brundage/Swatty are 0.250"×0.250", against which a 0.625" diameter spool is positioned with an 80 lg/in main spring.

In contrast, our preferred embodiment of FIG. 1 has a 0.4375" diameter spool with slave orifice 57 0.041" diameter by 0.060" long and is positioned with a 60 lb/in spring against two regulating ports 52 that vary from 0.020" wide at 5% stroke to 0.090" wide at full 0.200" stroke. With a compressive set force of 1.5 lb and main spool 53 area of 0.150 sq in., full stroke requires 470 ati to develop Fd of 14 lbs which is developed by pilot flow of 0.42 gpm through slave orifice 57. At a coil load of 470 ati and Pv of 2000 psi. regulated flow is 12.5 gpm since main spool 53 has been further destroked by a force of slightly under 6 lbs compared to 5 lbs at Pv of 1000 and slightly over 2 lbs at Pv of 300 psi. This valve has a hydraulic gain of 24 and a stable regulated flow over a wide range of valve pressure drop as shown in FIG. 7.

This embodiment is easily implemented for larger capacity The main spool 53 would be 0.625" diameter with 0.041" diameter by .060" long slave orifice 57, and is positioned with a 180 lb/in spring against two regulating ports 52 that vary from 040" wide at 5% stroke to 170" wide at full stroke of 0.320". With a compressive set force of 5 lbs. and main spool area of 0.442 sq. in., full stroke requires Fd of 66 lbs., which is developed by pilot flow of 0.55 gpm through slave orifice 57. This valve has a maximum regulated flow of 30 gpm at a valve pressure drop of 300 psi and a hydraulic gain of 55 (30/0.55).

This 30 gpm is similar in physical size to the prior art of Brundage/Swatty, but in contrast main spring rate is 180 vs 80 lbs/in., maximum width is 0.170" vs. 250". Our invention has a hydraulic gain less than 35% of the Brundage/Swatty valve to provide stability in regulated flow.

The preferred embodiment described above is used at system pressure of 3000 psi where the typical pilot throttling drop (g to TP in FIG. 1) is 2500 psi. By using a range of 50.70 lb/in main spring constant for valves with about 10 gpm maximum regulated flow and 150-200 lb/in main spring constant for valve of about 30 gpm. the pressure balance on main spool 53 is well suited to control efflux of momentum forces.

Blackburn also reviews the dependence of valve stability on the mass of a spool compared to its mating spring. The ratio of spring constant (lb/in ) to spool weight is high in our embodiment. For pilot spring 23 and pilot spool 21, the ratio is 3 lb/in to 0.45 oz or 107. For main spring 54 and main spool 53, this ratio is 60 lb/in to 0.30 oz or 3200 for our 10 gpm valve and 180 lb/in to 1.05 oz or 2700 for our 30 gpm valve. This ratio is more than double that for prior art. This high ratio insures stability of main spool 53 which directly experiences quick changes in Pv caused by abrupt changes in the working load requirement. This stability is important for cartridge valves which are often mounted close to the working load with little damping volume. Our main spool has only 10% of the spool weight in a 4-way proportional valve of prior art. Most of the resistance to instability derives from the high spring rate compared to regulated flow rate. Another aid to stability is the narrow width of regulating ports at vary small stroke of the main spool. In our invention, the high spring rate protects against fluid instability, not mechanical instability as described by Blackburn.

INTERACTIONS BETWEEN PILOT AND MAIN STAGE

It is important to understand that there are two separate circuits in our invention, each with their own requirements and with joint requirements for interaction. These two circuits for pilot flow and main flow have the same feed point (a) at system pressure. The pilot circuit is pressure balanced so that its limit for high operating pressure is determined only by structure, fit and finish to preclude hydraulic lock. The low limit for operating pressure is the total required for individual pressure drops comprised mainly of the drop through metering orifices 57 and 28. Pilot throttling ports 29 dissipate all excess pressure drop above this required minimum. With the preferred embodiment of FIG. 1, a minimum of 250 psi is specified for system pressure.

A key relationship between pilot and main circuit is the hydraulic gain, defined as the ratio of maximum regulated flow to maximum pilot flow in the control range. For the preferred embodiment of FIG. 1, rated at 12 gpm maximum, a maximum pilot flow of 0.42 gpm is used, or a hydraulic gain of 12/0.42 of 28. The increase in gain needed with higher regulated flow is not linear because the pressure drop force (Fd) of pilot flow through main spool 53 increases as the square of the increase of pilot flow. The size of main spool 53 main housing 51, regulating orifices 52 are increased as is the force constant of main spring 54. For 30 gpm maximum regulated flow the armature of curve 4c is used with metering orifice 28 of 0.065" diameter to balance a maximum pilot flow of 0.55 gpm to operate at a hydraulic gain of 55. In the 2-way cartridge valve of Brundage/Swatty, main spool has a 0.625" diameter and 0.03125" diameter slave orifice and is positioned with an 80 lg/in spring against two regulating ports 0.250" wide for a maximum main stroke of 0.250". With a compressive set force of 5 lbs and spool area of 0.307 sq. in., for full stroke the Brundage/Swatty valve requires a pressure drop force of 25 lbs. which is developed by pilot flow of 0.17 gpm through the main valve orifice. As hydraulic gain exceeds 100, control of the main spool becomes increasingly erratic, then delete balance of line 9, all of lines 10&11, then insert "Resolution degrades as hydraulic gain increases until only on-off action is possible for the gain of 300 (50/0.17) in Brundage/Swatty. In our invention both pilot flow and main spring constant are increased significantly as the capacity range for regulated flow is increased." and resolution degrades toward on-off for the gain of 175 (30/0.17) used by Brundage/Swatty Pilot flow should be increased significantly to control flows above 30 gpm.

Another interaction requirement is to partially cancel the nonlinearity of the pilot stage with the reverse nonlinearity of the main stage by controlling the flow coefficients Cp (for pilot metering orifice 28) and Cs (for slave orifice 57). A short tube orifice is used for both metering and slave orifice but with different L/D. Because of the requirements for hydraulic gain, slave orifice 57 area is always smaller than metering orifice 28 area so its Reynolds number is higher at the same pilot flow. For 0.20 to 55 gpm used in the control range, the relative change of Cs with pilot flow varies from 0.60-0.70. Since Cp varies from 0.30 to 0.60 the shape of regulating ports 52 provide a variable area gain with stroke of main spool 53 to correct for the difference in Cp vs. Cs.

Chambers are included in the pilot circuit for vortex and jet dissipation. Referring to FIG. 1 (a) acts as an upstream damping chamber and (b) is for downstream vortex shedding. Such protection is most important for pilot metering orifice 28. Interstage chambers b-c, combined with the offset from centerline of orifice 70 and screen 15, is to dissipate the fluid jet of pilot flow after it exits slave orifice 57. This combination provides a homogeneous energy level for fluid entering metering orifice 28, even for rapid changes in pilot flow. Chamber d downstream of metering orifice 28 provides a similar function of vortex shedding and jet diffusion for energy homogenization before pilot flow enters throttling ports 29. The volume of chambers c and d is about 100 times the volume of fluid in long tube pilot orifice 28. Side orifices 30 are not in the corner of chamber d, being displaced from the right wall of chamber d.

The result of this correction is seen in FIG. 7 as the performance curve a of the preferred embodiment of FIG. 1 operating at a Pv of 1000 psi. Curve 7b shows the hysteresis of prior art run with armature overlap and only a precision Teflon bushing around the armature for correction. The geometry of these chambers and use of short tube orifices in the pilot circuit enables stable and predictable control.

With the foregoing description of our invention, we now describe a final interaction of pilot stage with main stage used to achieve previously unattainable pressure compensation of regulated flow. Blackburn (op cit) teaches that control with pressure compensation is imperfect, showing that regulated flow increases with increasing pressure drop Pv until the ratio of the Bernoulli spring rate to the mechanical spring rate is unity as in curve (a) in FIG. 9. Blackburn curve 9a is applicable to main spools which are pilot operated, where the typical source of pilot pressure is auxiliary to the flow control valve itself. In our invention, the pilot source is integral to the valve and dependent on several interrelated variables. Our objective is to achieve true pressure compensation of main spool 53 or leveling the slope as shown by curve 9b, by using an offsetting slope in the pressure compensation curve of pilot spool 21 as shown in FIG. 8, the performance curve with varying Pv for the preferred embodiment of FIG. 1.

Figure 10:
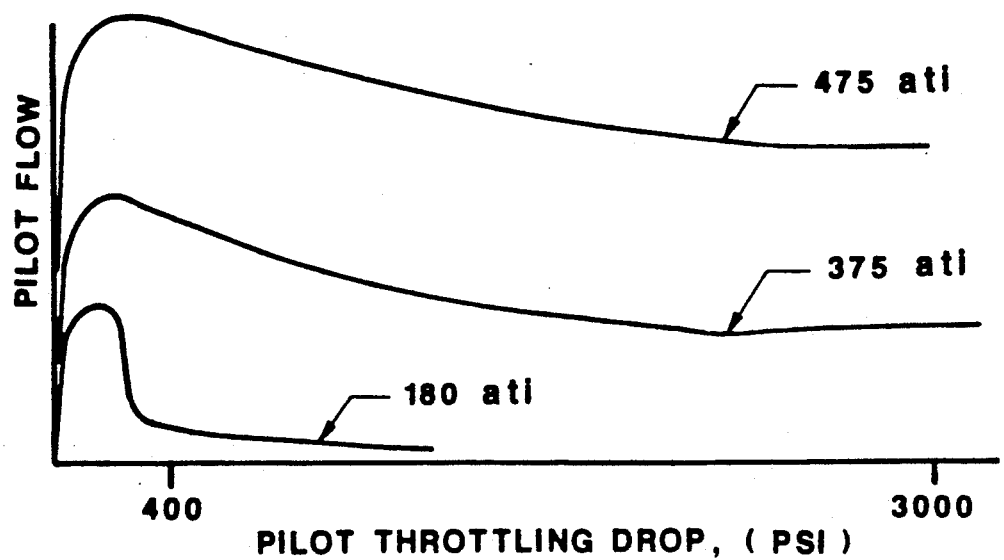

This objective is achieved by using the reduced pilot flow resulting from efflux of momentum forces at throttling ports 29 to correct the slope of Blackburn Curve 9a. Note in FIG. 10 that the effect of momentum-induced forces is relatively greater at low pilot stroke, under 0.004" for 0.20 gpm at Pv of 2000 psi. The performance of the pilot stage is affected by the pressure drop of pilot flow through slave orifice 57, compared to its behavior when operated separately. Curves 10a, b, c show the change in pilot flow with throttling drop across ports 29 for coil energy at various ati. The Bernoulli spring constant necessary to equal the mechanical spring rate of 2.5 lb/in used in spring 23 to achieve a Tau of unity is reached at a pressure drop across ports 29 of about 200 psi. Progressive further increase in pressure drop across ports 29 increases the Bernoulli spring rate and progessively lowers pilot flow rate by closing pilot spool 21, as shown in FIG. 10. This progressively lower pilot flow rate readjusts the force balance on main spool 53 since Fd is lowered. The net effect is to flatten regulated flow rate with increasing Pv, shown as a reduction of curve 9a to curve 9b. A minimum of 0.23 gpm is used for our control range of main spool 53 end curve 10c is shown only for illustration of poor control at pilot flow below 0.23 gpm. By proper selection of design parameters, the corrected performance of curve 9b does not exceed the uncorrected curve 9a until the system pressure limit of 3000 psi. The compensation of main spool 53 is excellent above a Pv of 300-400 psi, such that abrupt changes in system pressure do not seriously degrade the control of regulated flow.

Our valve is an open loop proportional control device with one input a variable coil current. The primary variable in all hydraulic systems that will affect the accuracy of flow control valves is pressure. Our invention uses efflux of momentum forces as an internal feedback that is linearly proportional with pressure drop through the valve. This feedback is expressed by a transducer already present the combination of the main spool and spring. Since this force acts directly on the spool, there is no measurable response time so this feedback is practically instantaneous.

Instead of overruling flow-induced forces by closed loop control, we have entered them into the valve design to achieve a previously unavailable result. The result of this design is a cartridge valve with part count and structure similar to an on-off cartridge, but which performs as a linear, proportional, pressure compensated flow control without use of special transducers or outside feedback loops.

Our design also makes the valve insensitive to two types of contamination which are frequently present in hydraulic fluids, entrained vapor and particulate contamination. The flats in the armature quickly vent any vapor, particularly at system start-up. The recess in the armature acts as a "contamination well" for particulates.

The invention has been described with preferred embodiments of a basic design. Modifications that rely on the basic design fall within the following claims.

We claim:

1. In an electrically controlled valve for controlling the flow of fluid from a volume at high pressure to a volume at low pressure:
   a. a cylindrical tube assembly closed at one end comprised of a trailing magnetic pole adjacent the closed end, a spaced attracting magnetic pole and a nonmagnetic spacer between said poles, a housing held in fixed relation to said tube assembly, said housing having radial throttling ports spaced from said attracting pole and open to said low pressure;
   b. a solenoid outside of said tube assembly and surrounding said poles which when energized creates a magnetic flux between said poles;
   c. a magnetic armature movable in said tube assembly in closed spaced relationship therewith and having a trailing portion overlapping said trailing pole, an attracted portion having an attracted end adjacent to and adapted to underlap and/or overlap the end of said attracted pole, and an intermediate portion:
   d. a spool slidable in said housing and operably associated with said armature to be moved thereby, said spool having an orifice therethrough communicating fluid from said high pressure through said throttling ports to said low pressure;
   the improvement which comprises:
   e. said intermediate portion of armature having a diameter less than said trailing and attracted portions to create a space to hold contaminants between said tube assembly and said intermediate portion, and said trailing and attracted portions having diametrically opposed flats to create passages from said attracted end to said trailing end of said armature.

2. In an electrically controlled pilot valve for controlling the flow of fluid from a fluid volume at high pressure to a volume at low pressure:
   a. a cylindrical tube assembly closed at one end and comprised of a trailing magnetic pole adjacent the closed end, a spaced attracting magnetic pole and a nonmagnetic spacer between said poles, a pilot housing being coaxial with said tube assembly and being held in fixed relation to said tube assembly, said pilot housing having radial pilot ports spaced from said attracting pole and opening to said low pressure;
   b. a solenoid outside of said tube assembly and surrounding said poles which when energized creates a magnetic flux between said poles;
   c. a magnetic armature slidable in said tube assembly in closed spaced relationship therewith and having a trailing portion overlapping said trailing pole, and an attracted portion having an attracted end adjacent to and movable to underlap and overlap the end of said attracting pole;
   d. a cylindrical pilot spool slidable in said pilot housing and operably associated with said armature to move therewith; said pilot spool having a metering orifice communicating at its upstream side with said fluid at high pressure and equalizing passages communicating the fluid pressure at the downstream side of said metering orifice to said armature, and flow passages from the downstream side of said metering orifice to said pilot ports;
   e. a pilot spring biasing said pilot spool for said flow passages to overlap said pilot ports with a predetermined set force; the improvement which comprises:
   f. said armature being common steel, said armature having a concave attracted end with the included angle of less than 20 degrees, and said pilot spring having a spring rate of 1–3 lbs per inch installed at a set force of 0.6 to 2 lbs, the attached end of said armature being spaced from said attracting pole when said flow passages in said pilot spool start to underlap said pilot ports, said solenoid being energized at least in an amount that the attracted end of said armature is magnetically semi-saturated above the knee of its magnetic curve before underlapping of said pilot ports by said flow passages in said pilot spool and the magnetic force increases linearly with increases in the energization of said solenoid above said knee.

3. The improvement of claim 2 wherein the initial underlap of the attracted end of said armature, when the underlap of said pilot spool with said pilot port commences, is such that the force-displacement curve over the designed range of movement of said armature is substantially flat.

4. The improvement of claim 2 wherein the initial underlap of the attracted end of said armature, when the underlap of said pilot spool with said pilot ports commences, is such that the force-displacement curve over the further designed range of movement is less than 10 lbs per inch for fluid flows under 0.50 gpm.

5. The improvement of claim 2 wherein said solenoid has an energizing current pulse width modulated at a frequency of 60–100 Hz.

6. The valve of claim 2 wherein said pilot housing and pilot spool are steel, said pilot spool having a surface hardness of at least 50 Rockwell C and being ground to a smooth surface, and the inner surface of said pilot housing being honed to a smooth surface and having a surface hardness Rockwell C higher than the hardness of the outer surface of said pilot spool.

7. The valve of claim 5 wherein said surfaces are honed or ground to final sliding clearances and carbonitrided by known processes at a temperature below 1100° F.

8. The improvement of claim 2 wherein the range of movement of said initial underlap of the attracted end of said armature when the underlap of said pilot spool with said pilot ports commences is such that the force displacement curve over the designed range of movement of said armature is less than 30 lbs per inch at solenoid energization levels less than 475 ati.

9. The improvement of claim 2 wherein the diametral clearance of said armature in said tube assembly is greater than 0.002 inches whereby containment particles in said fluid can pass between the armature and housing.

10. The valve of claim 2 and further including an exchangeable disc fitted in the upstream end of said pilot spool, said disc including said metering orifice.

11. The valve of claim 2 wherein said metering orifice is a sharp-edged orifice.

* * * * *